Fig. 9

John E. Orr
Robert G. Spring
INVENTORS

3,324,302
DEFECT SENSING SYSTEM FOR MOVING ARTICLES EMPLOYING MAGNETIC AND RADIATIVE DETECTOR
John E. Orr, Easton, and Robert G. Spring, Preston, Md., assignors to Wightman Electronics, Inc., a corporation of Maryland
Filed Feb. 10, 1966, Ser. No. 526,609
11 Claims. (Cl. 250—223)

This invention relates to the detection of defective articles which are being continuously conveyed past an inspection station and is a continuation-in-part of prior copending application U.S. Ser. No. 325,547, filed Nov. 22, 1963, now abandoned. More particularly, the present invention relates to the detection and rejection of sealed containers which are defective because of certain internal pressure conditions such as an abnormally low vacuum.

It is therefore a primary object of the present invention to provide a system for sensing internal pressure conditions within sealed containers without interrupting movement thereof and without mechanical or electrical contact with such containers.

A further object of the present invention is to provide an article detecting and rejecting system utilizing a magnetic probe device the output of which measures the proximity of the article at a reference location thereon such as the geometric center in order to determine the amount of deformation of the container at this location with a high degree of precision. In this manner, pressure conditions internally of sealed containers that need not have any special flip panels may be measured so as to enable the rejection of those containers that are defective because of abnormal conditions internally thereof.

A still further object of the present invention is to provide a defect sensing and rejection system for sealed containers wherein the containers are accelerated through a fixedly orientated magnetic, flux-linking field generated by a proximity detecting probe in order to produce an output from the probe when the field receives magnetically permeable portions of the containers. Photoelectric means are also provided so as to sample the output of the probe only when the containers passing through the magnetic field are at the same location therein. The use of photodetecting means for this purpose is preferred so as to avoid the introduction of error producing influences on the magnetic field.

An additional object of the present invention is to provide a defect sensing and rejecting system for sealed containers wherein a reject signal is generated when a container is at a predetermined location within a fixedly orientated magnetic field, if the container is defective, by sampling the voltage output of a magnetic probe device at the proper instant. Should the voltage output of the probe device exceed a predetermined level, during a relatively short interval of time, a corresponding pulse of short duration is passed by an And gate and then converted into a reject pulse of longer duration capable of energizing a solenoid operated reject device for displacing the defective container from the product path of movement.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
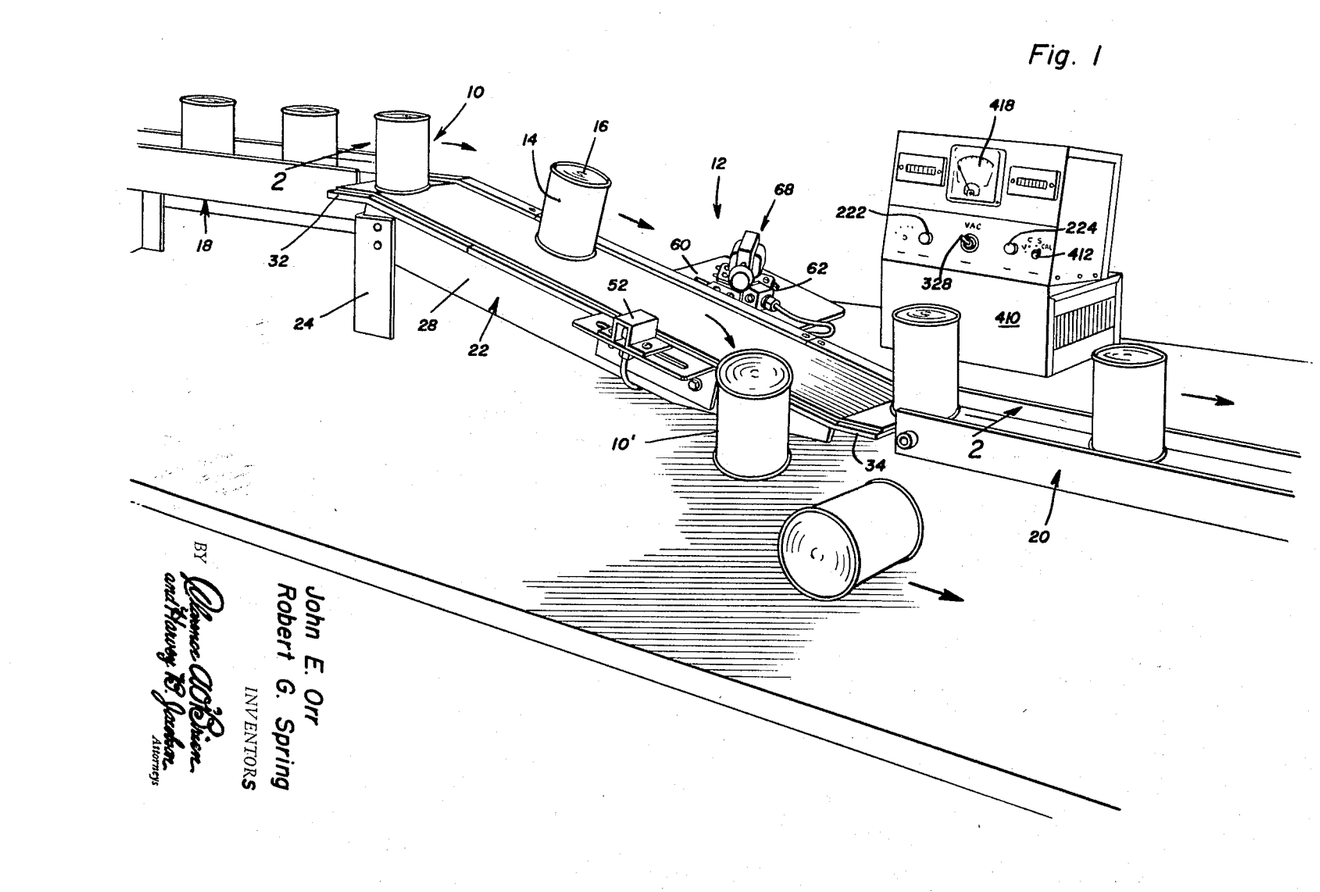
FIGURE 1 is a perspective view showing the installational arangement for the system of the present invention.

Referring now to the drawings in detail, it will be observed from FIGURE 1 that a plurality of articles such as containers 10 are conveyed past an inspection station generally denoted by reference numeral 12, the containers being of a common type can including a cylindrical wall 14 closed at opposite axial end by deformable end closures 16. Vacuum sealed within the containers, is some product which if defective, produces an abnormal internal pressure resulting in deformation of the end closures beyond an acceptable amount. By recognizing deformation of the end closure 16 beyond the acceptable amount at the geometric center where deformation is maximum, the system of the present invention is capable of rejecting those containers that are internally defective such as the containers 10' shown in FIGURE 1. In one embodiment of the invention therefore, containers are conveyed in a vertically upright position to the inspection station by means of a conveyor 18 at an elevated level relative to a delivery conveyor 20 conveying the acceptable containers away from the inspection station. The containers are conveyed past the inspection station by means of a gravity slide device 22, the upper end of which is supported at the level of the elevated conveyor 18 by means of the legs 24 while the lower end is disposed at the level of the delivery conveyor 20.

Figures 2, 3, 4:
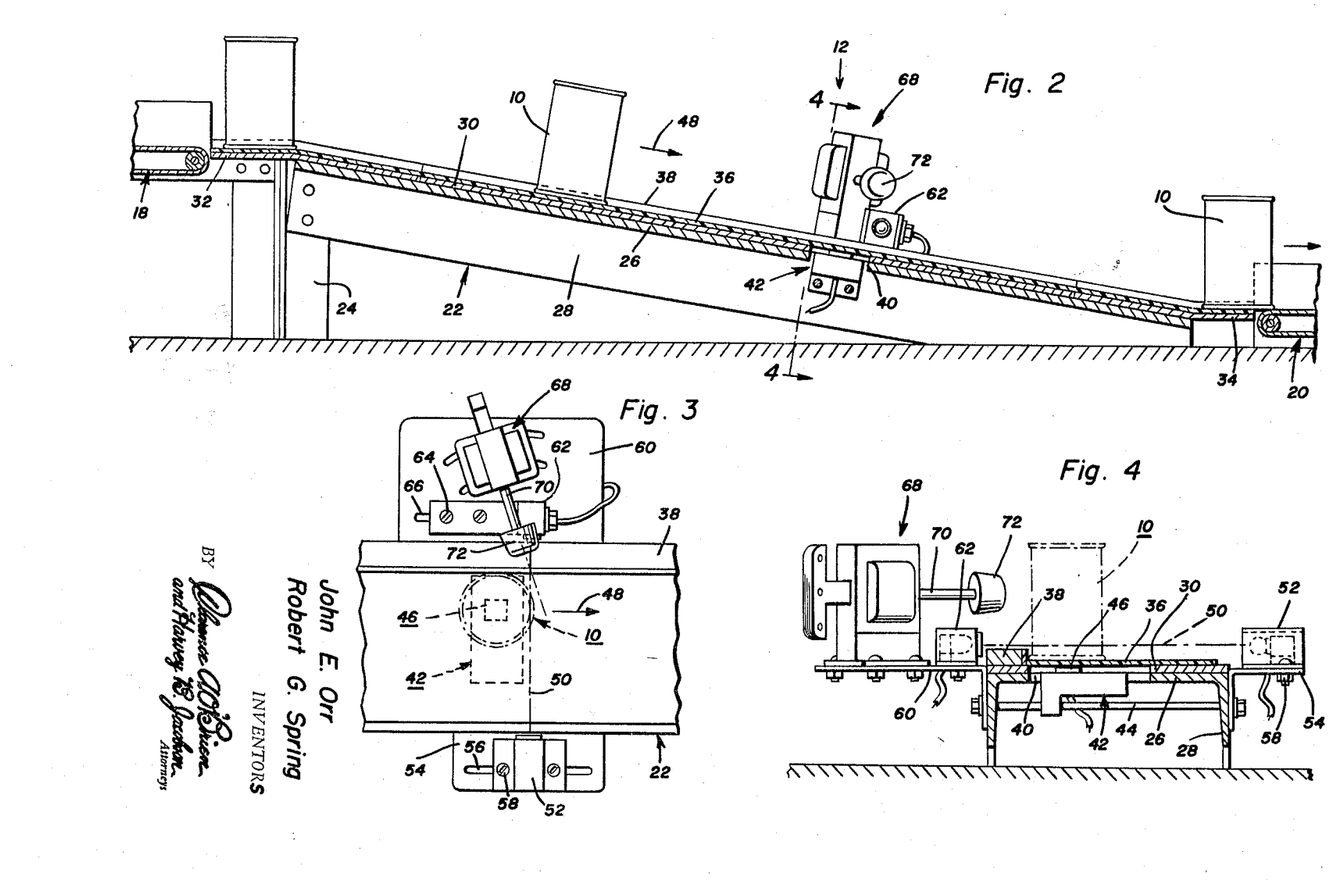
FIGURE 2 is a side sectional view through the apparatus shown in FIGURE 1.
FIGURE 3 is a top plan view of a portion of the apparatus shown in FIGURES 1 and 2.
FIGURE 4 is a transverse sectional view taken substantially through a plane indicated by section line 4—4 in FIGURE 2.

From FIGURES 2, 3 and 4, it will be observed that the slide device 22 may be formed from a downwardly opening channel member having a supporting web portion 26 and a pair of laterally spaced leg portions 28. A supporting surface member 30 is secured to the top of the web portion 26 of the channel member and extends longitudinally therebeyond forming upper and lower transitional end portions 32 and 34 arranged to be substantially at the supporting surface levels of the conveyors 18 and 20 respectively. Also lining the top of the supporting surface member 30 is a suitable material of uniform thickness such as a Teflon liner 36 over which the containers slide. The downward slope of the slide device 22 is selected so as to accelerate the containers by an amount dependent upon the speed with which the containers are conveyed toward the inspection station by the conveyor 18 in order to insure that the containers are spaced from each other along the slide device sufficiently to exceed the longitudinal dimension of a detection zone to be hereafter discussed. Further, the slide device is positioned by the legs 24 so as to be laterally tilted by a slight amount necessary to cause the containers to contact a fence 38 as more clearly seen in FIGURE 4.

As shown in FIGURES 2 and 4, the web portion 26 and supporting surface member 30 are provided with an opening 40 through which a proximity sensing, magnetic probe device 42 projects spaced from the bottom end closure of the can by the spacing liner 36. Accordingly, the probe device 42 is mounted in an adjusted position below the web portion 26 of the slide device in any suitable fashion as for example by the mounting bolt 44 extending transversely between the leg portion 28 of the channel slide member. The probe device is provided with a flux conducting core 46 the center of which is adjustably spaced from the fence 38 by an amount equal to the radius of the bottom end closure of the containers being inspected. It is for this reason, that the slide is laterally tilted as hereinbefore indicated. Thus, when the geometric center of a container is directly over the center of the core 46, as shown by dotted line in FIGURE 3, the output voltage of the probe device 42 is sampled as will be hereafter explained. It will also become apparent, that the probe device generates a magnetic flux-linking field through which the containers pass to determine the limits of a detection zone rearwardly and forwardly of the probe device in the direction of movement as indicated by the arrow 48. Thus the limits of the detection zone are those locations at which the approach and departure of a container is sensed by the probe device. The ability of the probe device to sense the proximity of the container will of course require bottom end closures which are made of a magnetically permeable material capable of affecting flux distribution of the magnetic field, the orientation of which is fixed by the adjustable mounting of the probe device as aforementioned.

In order to sample the output of the probe device 42 only when a container is aligned above the core 46 of the probe device as shown in FIGURE 3, the leading edge of the container is arranged to interrupt a beam of light 50. A light source such as lamp 52 is therefore positioned on one lateral side of the slide device by means of an angle bracket 54 in order to project the beam in a direction perpendicular to the direction of movement indicated by arrow 48. The bracket 54 is therefore provided with an adjustment slot 56 receiving the fastener assemblies 58 by means of which the light source 52 is adjustably spaced forwardly of the core 46 in order to adjust the spacing in accordance with the dimensions of the containers being inspected. Another supporting bracket 60 is mounted on the leg portion 28 of the slide channel opposite the source of light 52 in order to adjustably support a photo-cell detector 62 by means of the fasteners 64 extending through the adjustment slot 66 as more clearly seen in FIGURE 3. Accordingly, the photo-cell detector 62 is aligned with the source of light 52 in order to receive the beam 50 therefrom so that when the beam is interrupted, the output voltage of the probe device 42 will be sampled, the sampled output voltage corresponding to the amount by which the end closure of a container is deformed at the point of maximum deformation. If the sampled output voltage of the probe device exceeds a predetermined level corresponding to an unacceptable container, this particular container is laterally displaced from the slide device 22 by means of a solenoid operated reject device 68 also mounted on the supporting bracket 60.

As more clearly seen in FIGURE 3, the solenoid operated reject device includes a plunger 70 to which a container contacting element 72 is connected at one end. In the retracted position of the plunger 70 as shown in FIGURES 3 and 4, the contactor is closely spaced from the side of the containers as they pass along the fence 38. Further, the reject device 68 is secured to the bracket 60 in an angularly adjusted position so that the plunger 70 may be displaced at an angle to the beam of light 50 so as to engage a container forwardly of the core 46 in the direction of movement. The angular adjustment of the reject device 68 will depend upon the travel speed of the containers past the probe device in view of the time lag between sampling of the output from the probe device and energization of the reject device 68 should the sampled output be indicative of a defective container.

Figure 5:
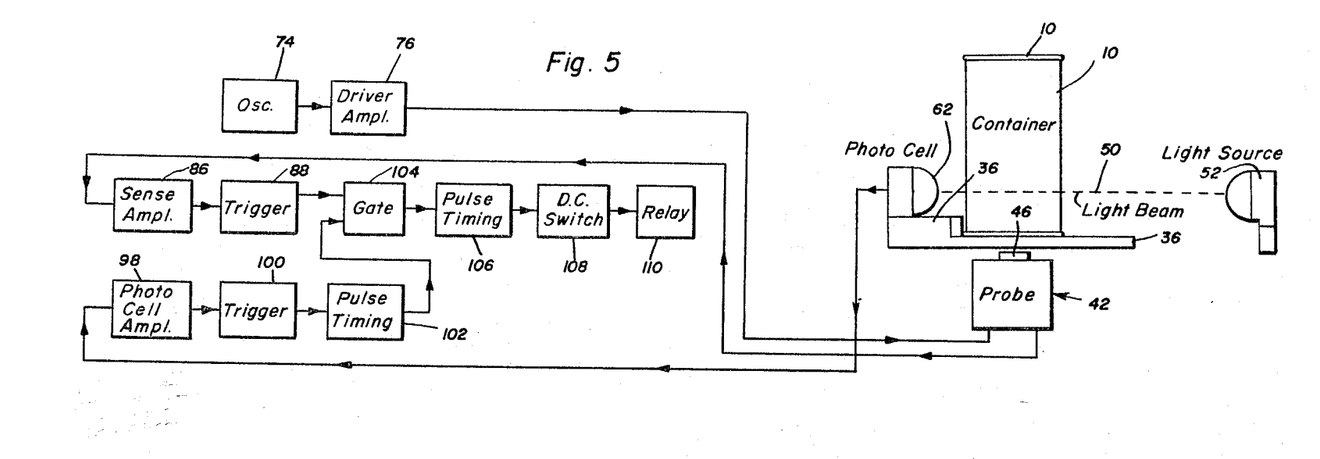
FIGURE 5 is a schematic diagram illustrating the system of the present invention.
Figure 6:
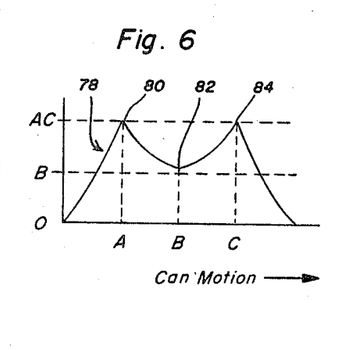
FIGURES 6, 7 and 8 are graphical illustrations showing certain operational characteristics of the system.

Referring now to FIGURE 5, it will become apparent that the energy for generating the magnetic field is derived from an alternating source such as the oscillator component 74 from which a 1000 cycle, sinusoidal output voltage is obtained and fed to a driver amplifier component 76 for supply to the probe device. The probe device is arranged so as to be normally in a null condition producing a very low or zero output voltage when there is no container within the magnetic field of the detection zone. Accordingly, when a container enters the detection zone the null condition is disturbed so as to produce an output from the probe device as depicted by the curve 78 in FIGURE 6. As the leading edge of the can approaches the detection zone, the voltage output of the probe device rises sharply to a peak value 80, corresponding to a location A as shown in FIGURE 6. The output of the probe device then declines to a minimum value 82 corresponding to the location of the geometric center of the container above the center of the core 46 of the probe device, this location being identified as B in FIGURE 6. As the container moves past location B, the output voltage of the probe device rises to a peak value 84 corresponding to a location C after which the trailing edge of the container departs from the detection zone occasioned by a drop in the output voltage toward zero.

Figure 7:
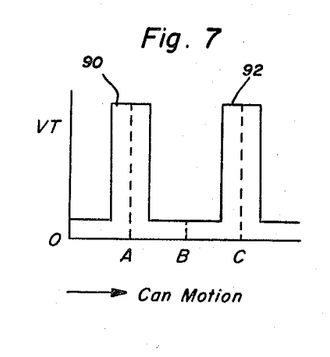
Figure 8:
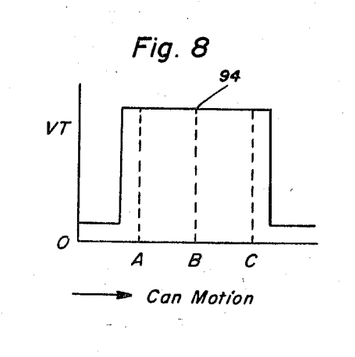

The output of the probe device is fed to the sense amplifier component 86 as shown in FIGURE 5 from which the amplified output of the probe device is supplied to a trigger component 88. The trigger component will therefore produce a pulse every time the amplified voltage supplied thereto from the sensing amplifier exceeds a predetermined level. An acceptable container will therefore produce a pair of high voltage pulses 90 and 92 as illustrated in FIGURE 7 corresponding to the peak output voltage values 80 and 84 of the probe device. However, if the container is defective, the minimum voltage value 82 corresponding to the centrally aligned location B will be above a critical value so that the trigger component 88 will then produce a continuous trigger voltage 94 as illustrated in FIGURE 8 as the container moves through the detection zone past locations A, B and C. When the container arrives at the location B however, the light beam 50 is interrupted so that the photo-cell detector 62 supplies a signal to the photo-cell amplifier component 96 from which an amplified signal is fed to a trigger component 100. The output of the trigger component 100 is converted to a synchronizing pulse of a relatively short duration such as 1 millisecond by means of the pulse timing component 102 in order to confine sampling of the trigger output voltage of trigger 88 to a relatively short interval during which the container passes the location B shown in the graphs of FIGURES 6, 7 and 8. Thus, the synchronizing output pulse of the pulse timing component 102 when fed to the And gate 104 simultaneously with the supply of trigger voltage from the trigger component 88, will produce an output pulse from the gate fed to a second pulse timing component 106 converting the pulse into a reject pulse of longer duration such as 20 milliseconds sufficient to operate a DC amplifier switch component 108 from which energizing current is supplied to the reject relay 110. The reject relay thereby operates the reject device 68 whenever the probe device 42 detects a defective container at the instant the light beam 50 is interrupted by the leading edge of the container.

Figure 9:
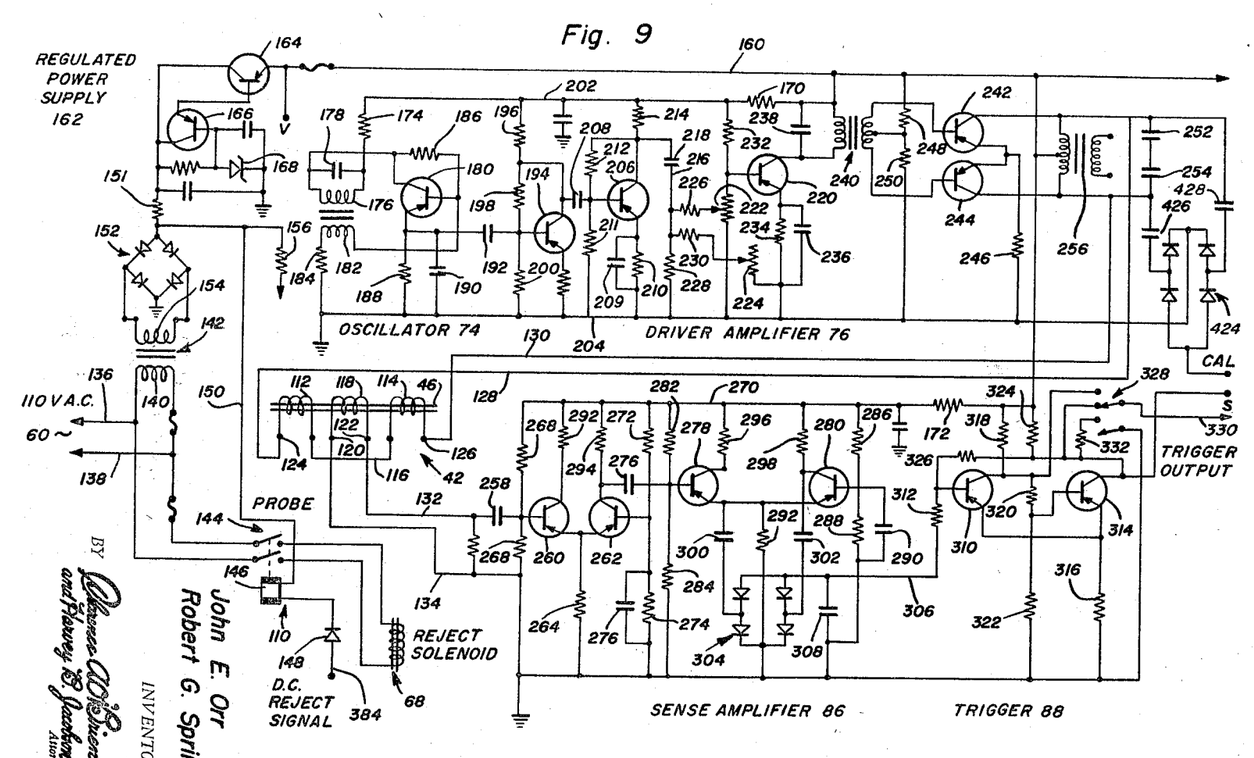
FIGURES 9 and 9A are electrical circuit diagrams pertaining to the electronic components of the system.

The probe device as shown in FIGURE 9, includes a pair of input end coils 112 and 114 which are electrically interconnected in series by the conductor 116. The input coils are mounted in common on the core 46 together with the central output coil 118 so as to be magnetically interlinked. The output terminals 120 and 122 of the probe device are connected to the output coil 118 while the input coils are respectively connected to the input terminals 124 and 126. Conductors 128 and 130 connect the input terminals of the probe device to the output of the driver amplifier while the output terminals are connected by the conductors 132 and 134 to the input of the sense amplifier and to ground respectively. The arrangement is such that a null condition exists in the output coil when there are no containers within the detection zone of the probe device.

With continued reference to FIGURE 9, it will be observed that electrical energy is derived from a 110 v. AC 60 cycle source to which the power lines 136 and 138 are connected, the power lines continuously supplying alternating current to the primary winding 140 of power transformer 142 and to the switch section 144 of the reject relay 110 which when energized closes the switch section so as to supply power directly from the power lines to the solenoid operated reject device 68. The relay switch section 144 is closed upon energization of the relay coil 146 when supplied with a DC reject signal at one terminal through the diode 148, the opposite terminal being connected by conductor 150 and resistor 151 to the negative, rectified output of the full wave rectifier bridge 152. The rectifier is therefore connected to the terminals of the secondary output winding 154 associated with power transformer 142. The output of the rectifier also supplies through the resistor 156, voltage to the photocell lamp 52. A regulated negative voltage of 10 volts is also supplied to the negative voltage line 160 from the regulated power supply 162 including the power transistor 164 having an emitter-collector circuit which interconnects the output of the rectifier 152 with the negative voltage line 160 and a control transistor 166 having a Zener diode 168 in its base-collector circuit for the 10 volt reference control. The voltage line 160 is connected to the final stages of the driver amplifier 76 and through the resistor 170 to the initial stages of the amplifier and to the oscillator 74. The negative voltage line 160 is also connected to the triggers 88 and 100, through resistor 172 to the sense amplifier 86, to the pulse timers 102 and 106 and to gate 104 for operation of the latter components.

Power is supplied to the oscillator component from voltage line 202 through voltage dropping resistor 174 connected to one terminal of the primary 176 in a coupling transformer which is frequency tuned by the capacitor 178. The collector of the oscillator transistor 180 is inductively coupled to the base by the coupling transformer, the secondary 182 of which is therefore between ground and the base in series with resistor 184. Base bias is regulated by the resistor 186 connected between the base and the collector. The output of the oscillator is taken from the emitter of transistor 180 connected to ground through resistor 188 having a by-pass capacitor 190. Accordingly, a sinusoidal output having a frequency of 1000 cycles is fed from the output emitter of transistor 180 through the coupling capacitor 192 to the input stage of the driver amplifier 76.

The input stage of the driver amplifier consists of transistor 194 having an input base to which the coupling capacitor 192 is connected, the base being maintained at the proper bias by the voltage dividing resistors 196, 198 and 200 connected in series between the negative voltage line 202 and the ground line 204. The collector of transistor 194 is connected to the juncture between resistors 196 and 198 for proper loading thereof and supplies an amplified output to the second stage transistor 206. Accordingly, the collector of transistor 194 is connected through the coupling capacitor 208 to the base of transistor 206 which forms part of an overdriven amplifier stage having a by-pass capacitor 209 for the emitter resistor 210 in order to limit response to the 1000 cycle frequency. The base of transistor 206 is maintained at the proper bias by voltage dividing resistors 211, 212 and 214 in order to supply a 1000 cycle square wave output to the output line 216 connected by the coupling capacitor 218 to the collector to which the juncture between the resistors 212 and 214 is connected.

The output of the second amplifier stage is fed to the third stage amplifier transistor 220 through an amplitude attenuating control arrangement consisting of a coarse adjustment potentiometer 222 and a fine adjustment potentiometer 224. The potentiometer 222 is connected to the output line 216 by resistor 226, the voltage in the output line being regulated above ground by the resistor 228. The output line is also connected by the resistor 230 to the fine adjustment potentiometer 224. The coarse adjustment potentiometer 222 is connected between the base of transistor 220 and ground so as to adjust the signal level of the input applied to the base of the transistor the bias of which is established by resistor 232 connected between the voltage line 202 and the base. The bias on the emitter of transistor 220 on the other hand is regulated by resistor 234 while by-pass capacitor 236 increases gain at 1000 cycles. The fine adjustment potentiometer 224 is connected between ground and the signal line 216 to adjustably shunt a portion of the 1000 cycle signal. An amplified output of an amplitude regulated by the potentiometers 222 and 224 is thereby obtained at the collector of transistor 220 and peaked at 1000 cycles by the capacitor 238 shunting the primary of the signal coupling transformer 240 through which a sinusoidal, 1000 cycle output is fed through the final output stage of the driver amplifier. The final stage is of the class B amplifier type including a pair of transistors 242 and 244 used in a push-pull manner by connecting both of the emitters thereof through resistor 246 to ground. The bases of the transistors 242 and 244 are connected to the opposite terminals of the signal transformer secondary having a center tap maintained at a proper voltage level by means of the voltage dividing resistors 248 and 250 connected in series between the regulated voltage line 160 and the ground line 204. The output at the final output stage is tuned by the series connected capacitors 252 and 254 connected across the output collectors of transistors 242 and 244 which are also connected across the terminals of the primary of transformer 256, the primary having a center tap connected to the regulated voltage line 160. The terminals of the transformer secondary are opened. A balanced 1000 cycle sine wave is thereby fed to the input terminals of the probe device 42 by means of the conductors 128 and 130 connected to the output collectors of the transistors 242 and 244.

The 1000 cycle output of the driver amplifier is supplied in out-of-phase relation to the input coils 112 and 114 of the probe device adjusted on the common core 46 with the output coil 118 in order to produce a null voltage condition when a container is outside of the detection zone and cannot influence the magnetic flux linking field produced by the input coils. Approach and departure of a container to the probe device will therefore produce a proximity indicating voltage at the output terminals 120 and 122 of the probe device as herebefore explained. The output voltage of the output coil 118 is therefore supplied through conductor 132 and the coupling capacitor 258 to the input base of a first differential amplifier stage consisting of the transistors 260 and 262. The emitters of the transistors are therefore provided with a common emitter resistor 264. The input base of transistor 260 is maintained at the proper bias by the voltage dividing resistors 266 and 268 connected in series between the negative voltage line 270 and ground. The transistor 262 is in a common base arrangement with the base thereof connected to the juncture of the voltage dividing resistors 272 and 274, the resistor 274 having a by-pass capacitor 276 for shunting any signal thereon to ground. The output collector of transistor 262 is connected by the coupling capacitor 276 to the input base of a second differential amplifier stage consisting of the input transistor 278 and the output transistor 280, interconnected in an arrangement similar to that described with respect to the first differential amplifier stage of the sense amplifier. Accordingly, the input base of transistor 278 is maintained at the proper bias by the voltage dividing resistors 282 and 284 while the base of transistor 280 is provided with the voltage dividing resistors 286 and 288, the resistor 288 having a by-pass capacitor 290. The interconnected emitters of transistors 278 and 280 are connected above ground by the emitter resistor 292. Also, the collectors of all of the transistors 260, 262, 278 and 280 are properly loaded by the resistors 292, 294, 296 and 298 respectively. Both of the collectors of the transistors 278 and 280 in the second differential amplifier stage, however, are connected through coupling capacitors 300 and 302 to the input terminals of a full wave rectifier bridge 304 in order to supply a rectified, negative voltage to the output line 306 proportional in amplitude to the 1000 cycle signal voltage supplied to the sense amplifier from the output of the probe device 42. A filter capacitor 308 is connected between ground and the output line 306 of the rectifier bridge 304 in order to filter out most of the ripple components in the amplified signal.

The output line 306 of the sense amplifier supplies the rectified signal voltage to the input base of transistor 310 through the coupling resistor 312. The transistor 310 together with a transistor 314 form a modified Schmitt type of trigger circuit. The interconnected emitters of the transistors 310 and 314 are connected to ground by the resistor 316 in order to establish the proper emitter bias while collector load is established through resistor 318 interconnected between the collector of transistor 310 and the regulated voltage line 160. Supply of a negative voltage of predetermined level to the input base of transistor 310 corresponding to a value below the peak output voltages 80 and 84 of the probe device as shown in FIGURE 6 switches on the transistor 310 for a predetermined duration in order to supply a positive cut-off voltage to the base of the transistor 314 through the resistor 320 interconnecting the collector of transistor 310 with the base of transistor 314. The voltage applied to the base of transistor 314 is maintained at a proper level above ground by means of the resistor 322. Further, the output collector of transistor 314 is properly loaded by resistor 324 while a feed back resistor 326 connects the output collector of transistor 314 to the input base of transistor 310 supplying a small positive feed back voltage in order to limit switching operation of the transistor 310 to a small input voltage range in order to avoid any response to remaining ripple components when the signal voltage supplied from the output of the probe device is close to but not at the desired signal level. It will therefore be apparent, that the transistor 314 is in a normally conductive state so that upon switching of the transistor 310 to a conductive state, cutoff of the transistor 314 causes a shift in the voltage at its collector in a negative direction toward the minus 10 volt potential of the regulated voltage line 160 to which it is connected by the resistor 324. Thus, when the selector switch assembly 328 is in the vacuum position shown in FIGURE 9, the output collector of transistor 314 is connected to the trigger voltage output line 330. In this position of the switch assembly 328, the system will be in a condition for detecting abnormally low vacuums within the sealed containers. With the switch assembly 328 displaced to a pressure position, the trigger voltage line 330 is connected to the collector of transistor 310 while ground is applied to the collector of transistor 314 through resistor 332. This will reverse operation of the trigger component 88 when abnormally low pressure conditions within the sealed containers are being detected by the system rather than low vacuum conditions.

Figure 9A:
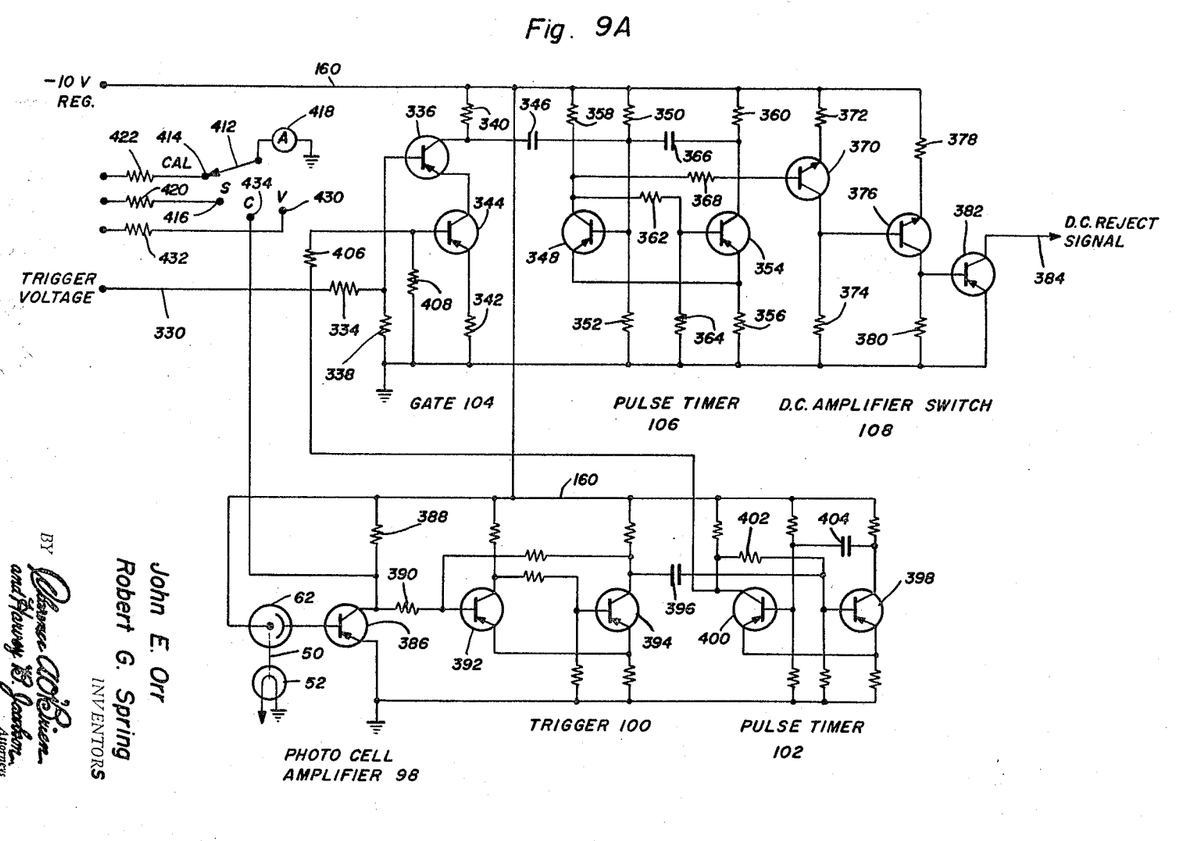

Referring now to FIGURE 9A, it will be observed that a relatively high negative trigger voltage may be supplied through resistor 334 to the input base of transistor 336 in the gate circuit 104, the voltage level above ground applied to the base being regulated by the resistor 338. The existence of the trigger voltage either at spaced intervals between locations A and C as depicted in FIGURE 7 or continuously from location A to C as depicted in FIGURE 8 will therefore switch the transistor 336 on during the indicated intervals in order to complete a circuit between ground and the regulated voltage line 160 in series with the load resistor 340, the emitter resistor 342 and the emitter collector circuit of the transistor 344, when the transistor 334 is switched on for a short duration. The duration during which the transistor 334 is switched on is relatively short so that the trigger voltage signal applied to the transistor 336 will be sampled only at the instant the geometric center of the container is passing over the center of the probe device core corresponding to location B as shown in the graph of FIGURES 6, 7 and 8. Thus, if any trigger voltage is present at such time as shown in FIGURE 8, indicative of a defective container, an output pulse of short duration will be fed from the collector of transistor 336 through the coupling capacitor 346 to the input base of transistor 348 maintained at the proper bias level by the voltage dividing resistors 350 and 352 connected in series between the negative voltage line 158 and ground. The transistor 348 together with the transistor 354 are interconnected in a mono-stable multi-vibrator circuit to form the pulse timer 106. Accordingly, the emitters of the transistors 348 and 354 are interconnected about ground by the resistor 356 while the collectors thereof are connected to the negative voltage line 160 through the load resistors 358 and 360. The collector of transistor 348 is connected through resistor 362 to the base of transistor 354 maintained at the proper voltage level above ground by the resistor 364. In conjunction with the coupling resistor 362, the timing capacitor 366 interconnected between the base of transistor 348 and the collector of transistor 354 determines the duration of the output pulse produced at the collector of transistor 348 when the mono-stable multi-vibrator is switched from its quiescent state by a short input pulse supplied to the base of transistor 348. Accordingly, a reject pulse of longer duration may be fed through the coupling resistor 368 to the DC. amplifier switch component 108 capable of developing an energizing voltage suitable for operating the reject device 68.

The reject pulse is supplied to the base of transistor 370 of the NPN type as compared to the PNP type of transistors heretofore utilized and which is normally conducting because of the low negative voltage on its base in the absence of any reject signal. The negative reject pulse is therefore operative to switch off the transistor 370 in order to change the voltage on the base of transistor 376 negatively from the voltage level held thereon by the resistor 374. The transistor 376 interconnected between the negative voltage line 160 and ground by the resistors 378 and 380 is thereby switched to a conductive state in order to increase the negative voltage held by the resistor 380 on the base of power transistor 382 causing it to conduct. When switched on, the transistor 382 completes an energizing circuit from positive ground to the DC reject signal line 384 connected to the reject relay coil 146 as hereinbefore described in connection with FIGURE 9. Operation of the reject device 68 is therefore effected only when the container interrupts the light beam 50 if a trigger voltage is produced during a short interval at that time substantially less than the detection period while the probe device is producing an output.

The negative voltage line 160 is connected to the photocell detector 62 so that with the detector normally receiving the light beam 50, a negative bias is held on the base of the photocell amplifier transistor 386, the emitter of which is connected to ground and the collector of which is connected to the negative voltage line through the load resistor 388. When the beam 50 is interrupted, the negative bias on the base is removed so as to switch the transistor 386 to a non-conductive state producing a sharp negative increase in the voltage on the collector to 8 volts for example. The output collector of transistor 386 is connected by the coupling resistor 390 to the base of transistor 392 in a Schmitt trigger circuit also including the transistor 394. The negative signal voltage applied to the base of transistor 392 when the beam 50 is interrupted will therefore shift the voltage at the collector of transistor 394 in a negative direction from a low negative condition toward the 10 volt potential of the negative voltage line 160. This output of the trigger component 100 is fed through the coupling capacitor 396 to the base of transistor 398 connected in circuit with the transistor 400 to form a pulse timer 102 similar in arrangement and operation to the pulse timer 106 hereinbefore described. The trigger voltage supplied to the pulse timer 102 will therefore produce the 1 millisecond output pulse as determined by the resistor 402 and capacitor 404 cross coupling the collectors and bases of the transistors 398 and 400. Accordingly, a relatively short synchronizing pulse is supplied from the output collector of transistor 400 to the input base of transistor 344 in the gate circuit 104 through the coupling resistor 406, the base of transistor 344 being maintained at the proper level above ground by the resistor 408. As hereinbefore indicated, the synchronizing pulse switches on the transistor 344 for a short interval in order to restrict sampling of the trigger voltage supplied to the gate circuit by the trigger voltage line 330 substantially to the instant when interruption of the light beam 50 occurs upon arrival of a container at a location wherein its geometric center is aligned with the center of the probe device core.

It will be apparent from the foregoing, that successful operation of the system of the present invention requires that the source of light 52 and photo-cell detector 62 be adjusted so that the light beam is disposed perpendicular to the direction of travel of the containers and is spaced forwardly of the probe device a distance dependent upon the container dimension. The angular position of the reject plunger 70 is also adjusted to project at an angle in the direction of the container motion by an amount so as to engage a container approximately over the photo-cell device 62 for medium speeds of the container for example. The downward slope of the slide device 22 should also be adjusted in order to insure that the containers will be spaced apart a distance necessary to avoid proximity sensing of more than one container at a time by the probe device. The electronic components which may be housed within a chassis 410 as shown in FIGURE 1 will be adjusted through the attenuating potentiometer controls 222 and 224 in order to set the rectified, 1000 cycle voltage in line 306 at a level sufficient to operate the trigger 88 and thereby energize the reject device 68 when the center of a defective reference container passes over the probe device. In order to measure this value of the trigger voltage, a meter switch 412 is moved from its normal position engaging a calibrating contact 414 to a trigger voltage measuring contact 416. The meter switch is therefore connected to a grounded ammeter 418 while the contact 416 is connected through the resistor 420 to the output collector of the transistor 314 in the trigger component 88. With the meter switch 412 in its normal position engaging the contact 414, the meter 418 is connected through the resistor 422 to the output of the driver amplifier by means of the full wave rectifier bridge 424 and the coupling capacitors 426 and 428 in order to indicate the output amplitude of the driver amplifier corresponding to the setting of the attenuating control potentiometers 222 and 224. In the position of the meter switch engaging the voltage contact 430, the meter 418 is connected through resistor 432 to the emitter of transistor 164 in the regulated power supply 162 in order to check on the availability of a proper regulated supply voltage. Finally, the output voltage of the photo-cell amplifier 98 may be checked by moving the meter switch into engagement with the contact 434 connecting the meter 418 to the output collector of transistor 386.

It will therefore be apparent from the foregoing description, that the system of the present invention may be adjusted to handle containers of different dimensions and is in no way restricted to specific types of container closures because of the use of a proximity sensing probe of the magnetic flux linking type rather than optical detecting arrangements. For this reason either end of the container may be measured for deformation and the probe device is more conveniently mounted below the container. Further, the signal output of the magnetic probe device not only indicates the proximity of a container but its varying output voltage is analyzed and sampled at the proper instant to determine whether the container is acceptable or should be rejected. No precise speed control is therefore required for movement of the containers. An optical detector is preferably utilized to determine the proper instant at which the probe output is sampled inasmuch as it is operationally independent of and will in no way interfere with the magnetic field of the probe device and thereby avoid introducing any detection error.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A system for sensing defective articles comprising, means for conveying said articles through a detection zone, proximity sensing means establishing a magnetic field in said detection zone for sensing approach and departure of the articles to and from a fixed location within the detection zone, radiation sensitive detecting means fixedly mounted for sensing arrival of the articles at said fixed location within the detection zone without affecting said magnetic field, and signal sampling means rendered operative by the detecting means only when the articles are at said fixed location for developing a reject signal in response to an output of the proximity sensing means exceeding a predetermined level.

2. The combination of claim 1 wherein said detecting means includes a source of radiation projecting a beam spaced from said fixed location for interruption by the articles when at said fixed location, and a photo-cell detector receiving said beam.

3. The combination of claim 2 wherein said signal sampling means comprises, synchronizing means connected to the detecting means for establishing a synchronizing pulse of a duration substantially less than said detection period when the beam is interrupted, means connected to the proximity sensing means for developing a trigger voltage when the output of the proximity sensing means exceeds said predetermined level, gate means passing said trigger voltage only during the presence of the synchronizing pulse and pulse timing means connected to the gate means for increasing the duration of the output of the gate means to form said reject signal.

4. The combination of claim 1 wherein said signal sampling means comprises, synchronizing means connected to the detecting means for establishing a synchronizing pulse of short duration, means connected to the proximity sensing means for developing a trigger voltage when the output of the proximity sensing means exceeds said predetermined level, gate means passing said trigger voltage only during said synchronizing pulse and pulse timing means connected to the gate means for increasing the duration of the output from the gate means to form said reject signal.

5. The combination of claim 4 wherein said proximity sensing means includes input coil means, an output coil, core means magnetically coupling the output coil to the input coil means for producing a varying output during a limited detection period, the instantaneous output of the output coil during the detection period when an article is at the fixed location being a function of the spacing of the article from the core means and driving means connected to the input coil means maintaining the output coil in a null condition in the absense of any articles in the detection zone.

6. The combination of claim 1 wherein said conveying means includes a gravity slide having a supporting surface and a side fence, and means positioning the slide at a downward slope accelerating the articles from a horizontal approach position and laterally tilted for abutment of the articles with said fence while passing through the detection zone.

7. A method of determining when the pressure internally of a moving container is of abnormal value comprising the steps of: generating a magnetic field of fixed orientation; passing said container along a fixed path through said magnetic field; measuring the electrical energy produced in response to passage of the container through said magnetic field during a predetermined detection period; establishing a radiation beam having no effect on the magnetic field which is interrupted by the container during passage thereof through the magnetic field; sampling the level of electrical energy measured when the beam is interrupted during an interval of time substantially less than said detection period; and producing a reject signal when the sampled electrical energy exceeds a predetermined level during said interval.

8. The method of claim 7 wherein said containers are accelerated through the magnetic field for spacing thereof by an amount exceeding in travel time the detection period.

9. A system for sensing and rejecting defective containers having end closures deformable in response to abnormal pressure conditions internally of the container, comprising, means for guiding movement of said containers along a predetermined path one at a time through a detection zone, photo-cell detecting means establishing a beam of radiation through said zone perpendicular to said path of movement, a magnetic proximity sensing device positioned below said guiding means having a core aligned with an axis intersecting said path of movement rearwardly spaced from the beam of radiation in the direction of movement, said proximity sensing device having an output coil and a pair of input coils mounted on said core, said input coils being positioned on either side of said output coil and electrically connected in series, a reject device having plunger means displaceable transversely across said path of movement at an angle to said beam for engaging a container forwardly of the core, a source of voltage, an oscillator connected to said source, driver amplifier means connecting said oscillator to the input coils of the proximity sensing device for supply of electrical energy thereto, sensing amplifier means connected to the output coil for amplifying a signal voltage induced in said output coil when a container passes through said detection zone, said signal voltage having peak values spaced apart by a detection interval between approach and departure of the container to the core and a minimum value during said interval as the geometrical center of the container passes over the axis of the core, trigger means connected to the sensing amplifier means for developing a trigger voltage in response to a signal voltage exceeding a predetermined level corresponding to a defective container, synchronizing means connected to said photo-cell detecting means for developing a synchronizing pulse of a duration less than said detection interval in response to interruption of said beam by the leading edge of the container when the signal voltage is at said minimum value, an And gate connected to the trigger means and the synchronizing means for passing said trigger voltage only during said interval of the synchronizing pulse, pulse timing means connected to said And gate for producing a reject pulse of longer duration than the synchronizing pulse and amplifier switch means connecting the pulse timing means to the reject device for energization thereof in response to said reject pulse.

10. The combination of claim 9 wherein said guiding means comprises a gravity slide having a supporting surface and a side fence, and means positioning the slide at a downward slope accelerating the containers from a horizontal approach position and laterally tilted for abutment of the containers with said fence while passing through the detection zone.

11. Apparatus for sensing and rejecting defective articles comprising, a gravity slide extending through a detection zone, means for supporting said slide in a laterally tilted position urging articles in a transverse direction during downward acceleration longitudinally along the slide, a fence mounted by the slide retaining said articles in a laterally fixed position on the slide, a magnetic proximity detector mounted below the slide in transversely fixed relation to the fence, a radiation sensitive position detector mounted by the slide for enabling sampling of the output of the proximity detector when an article is aligned therewith, and a reject device operatively connected to said detectors for displacing defective articles transversely of the slide in a direction away from the fence.

References Cited
UNITED STATES PATENTS

| | | | |
|---|---|---|---|
| 2,524,929 | 10/1950 | Razek | 88—14 |
| 3,020,472 | 2/1962 | Cauley | 324—34 |
| 3,064,807 | 11/1962 | Stover | 209—111.8 X |
| 3,131,815 | 5/1964 | Mathias | 250—223 |
| 3,206,027 | 9/1965 | Bailey | 209—111.8 |

WALTER STOLWEIN, *Primary Examiner.*